(12) United States Patent
Sugawara

(10) Patent No.: US 6,196,588 B1
(45) Date of Patent: Mar. 6, 2001

(54) INSTRUMENT PANEL STRUCTURE

(75) Inventor: Mamoru Sugawara, Tokyo-To (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/190,015

(22) Filed: Nov. 12, 1998

(30) Foreign Application Priority Data

Nov. 26, 1997 (JP) .................................................... 9-324992

(51) Int. Cl.[7] .................................................. B62D 25/14
(52) U.S. Cl. ............................ 280/779; 280/752; 180/90
(58) Field of Search ........................... 296/70, 194, 208; 280/752, 779; 180/90

(56) References Cited

U.S. PATENT DOCUMENTS

| | | | |
|---|---|---|---|
| 5,676,216 | * | 10/1997 | Palma et al. ............................ 180/90 |
| 5,865,468 | * | 2/1999 | Hur ....................................... 280/752 |
| 5,934,733 | * | 8/1999 | Manwaring ........................... 280/752 |
| 5,951,045 | * | 9/1999 | Almefelt et al. ....................... 280/752 |
| 6,010,147 | * | 1/2000 | Brown ................................... 280/752 |

* cited by examiner

Primary Examiner—Richard M. Camby
(74) Attorney, Agent, or Firm—Smith, Gambrell & Russell, LLP

(57) ABSTRACT

An instrument panel structure provided in front of a driver's seat and a front passenger seat in a car has a steering support beam therein. An instrumental panel covers the steering support beam on the side of the driver's seat and the front passenger seat. Knee guards are disposed between the steering support beam and the instrument panel. An air-conditioning duct is fixed to the instrument panel above the knee guards, for preventing the knee guards from moving upwardly and for forming a duct space with the instrument panel. The air-conditioning duct and knee guards can support the legs of the passenger during an accident, thereby preventing the "submarine" phenomenon and improving passenger's safety. Additionally, the air-conditioning duct reinforces the instrument panel, thereby reducing the need for other reinforcing elements in the instrument panel.

11 Claims, 6 Drawing Sheets

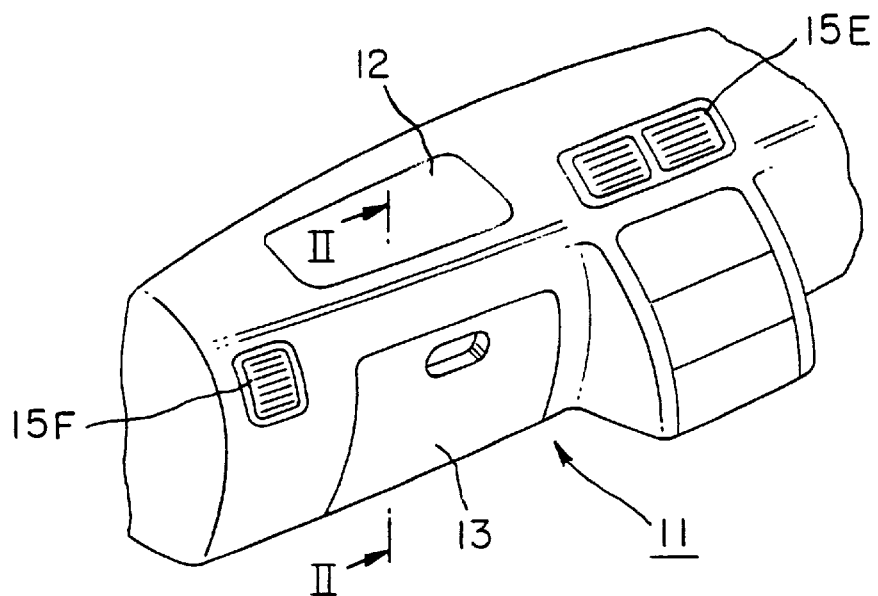
F I G. 1
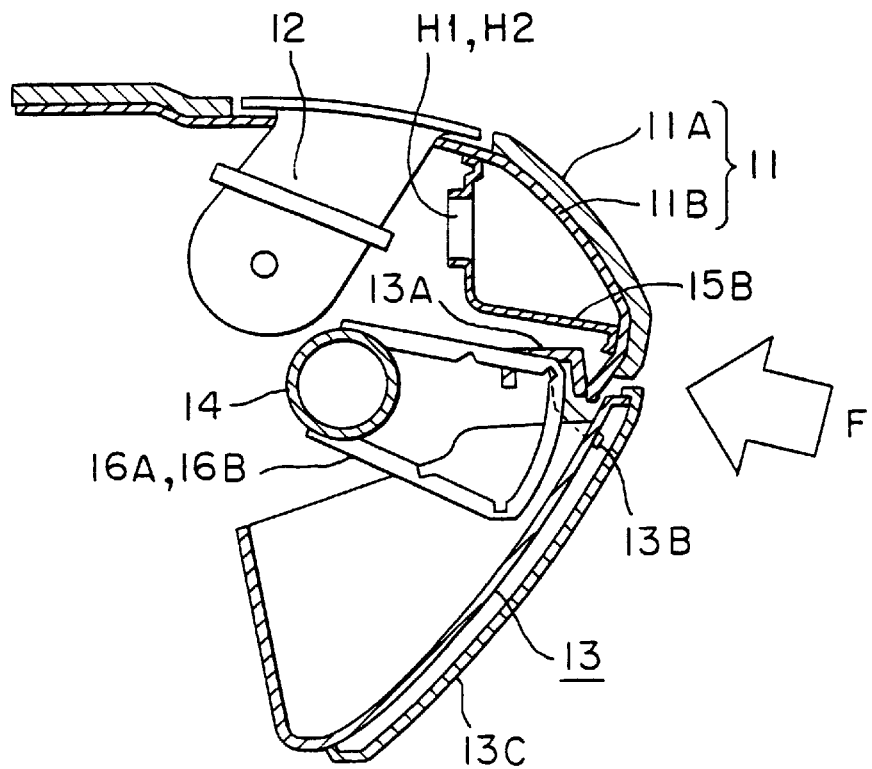
F I G. 2

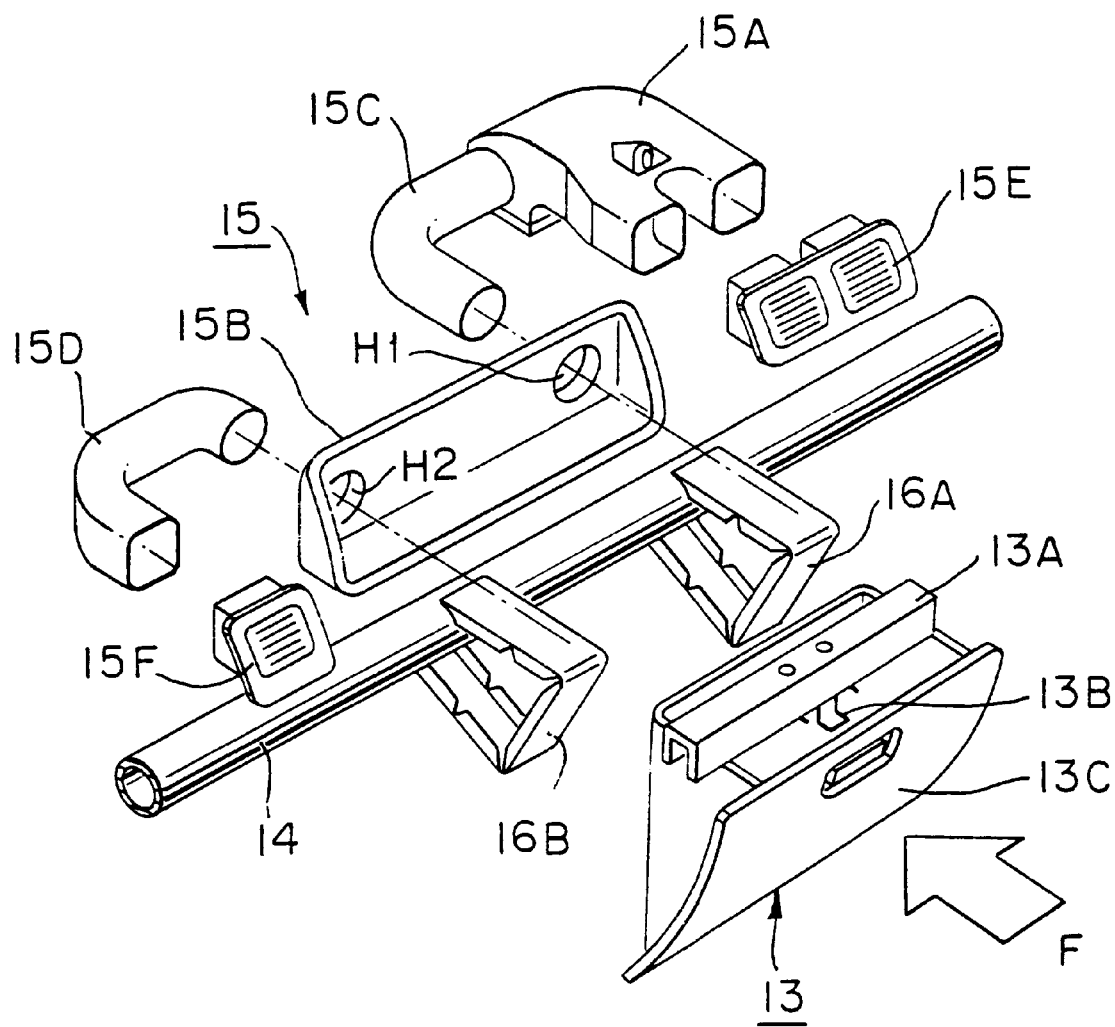
F I G. 3

INSTRUMENT PANEL STRUCTURE

FIELD OF THE INVENTION

The present invention relates to an instrument panel structure of a car and, in particular, to an instrument panel structure for improving safety of the passenger in the front passenger seat when an unexpected collision occurs.

BACKGROUND OF THE INVENTION

In a car with an air bag for the front passenger seat, the passenger in the front passenger seat is protected by an air bag which operates when an unexpected collision occurs. In addition, there are provided various measures for preventing a diving phenomenon i.e. "submarine" phenomenon that occurs when an inertia at the collision causes the legs, especially knees, to hit directly and crumple the instrument panel, resulting in the passenger being pushed under the instrument panel.

FIG. 8 is a sectional view of a conventional instrument panel structure. FIG. 9 is an exploded perspective view of the instrument panel structure in FIG. 8. As shown in FIG. 8 and FIG. 9, an air bag 22 for the front seat passenger is mounted in an upper portion of a space within the instrument panel 21. A glove box 23 is arranged behind a lower portion of the instrument panel 21.

The glove box 23 is kept closed by a locking mechanism which engages with a striker 23B mounted at a bracket 23A. The bracket 23A is mounted on the inside of the instrument panel 21. A lid 23C covers the front surface of the glove box 23 i.e. the surface facing the front passenger seat.

A steering support beam 24 and a duct 25 for an air-conditioner are arranged within the instrument panel 21. The steering support beam 24 is laterally laid in front of the driver's seat and the front passenger seat. Both ends of the steering support beam 24 are connected to the front pillars (not shown) respectively to support the steering system on the side of the driver's seat.

Knee guards 26A and 26B are mounted on the steering support beam 24 on the front passenger seat side at positions to face the lid 23C of the glove box 23. A knee guard bar 27 is laid between the knee guards 26A and 26B. The knee guards 26A, 26B face the inside left edge and the inside right edge of the lid 23C respectively.

When an unexpected collision occurs, the knee guards 26A, 26B crumple to absorb the energy of the inertia F of the legs of the passenger in the front passenger seat and receive his knees and the lid 23C together with the steering support beam 24.

This prevents the glove box 23 and the front passenger from being pushed under the instrument panel 21, thereby preventing the so-called "submarine" phenomenon.

The knee guard bar 27 is a pipe element. The bar 27 is laterally laid between the knee guards 26A and 26B and the ends of the bar 27 are fixed to the knee guards 26A and 26B respectively. This serves to reinforce the mechanical strength of the knee guards 26A and 26B. During the collision, the bar 27 supports the instrument panel 21 on the reverse side, thereby preventing an excessive deformation of the instrumental panel 21, and also receive the chest thereby preventing the passenger from hitting his head against the windshield.

The duct 25 is communicated with any type of the air conditioners (not shown) to ventilate the outside air, inside circulated air, cooled air, heated air or the like into the interior of the car.

The duct 25 comprises a center duct ("duct center ventilation") 25A arranged in the central portion and a side duct ("duct side ventilation") 25B arranged on the passenger seat side. The duct center ventilation 25A is communicated with a central duct outlet ("grille center ventilation") 25C built into the middle of the instrument panel 21. The duct side ventilation 25B is connected with the duct center ventilation 25A and a side duct outlet ("grille side ventilation") 25D built into the passenger seat side of the instrument panel 21.

Some other techniques to prevent the "submarine" phenomenon are described in the Japanese Patent Laid-Open 234031/1985 and the Japanese Utility Model Laid-Open 46958/1992.

The above conventional instrument panel structures contain hollow ducts, the glove box (including brackets and a striker) and the air bag, which leaves a small remaining free space inside of the instrument panel structure, that is, within the dashboard. This makes it difficult to install other elements than the knee guards and the bar for preventing the submarine phenomenon.

In addition, the conventional "submarine" phenomenon prevention structure consists of a large number of elements. Furthermore each element must be strong, which causes to increase the complexity, manufacturing cost and the weight of the instrument panel structure.

SUMMARY OF THE INVENTION

The object of the present invention is to solve the above problems, that is, to raise the safety level for the passenger in the front passenger seat by increasing support force for his or her knees when a collision occurs, to provide a space for arranging elements within the interior of the instrument panel, and to decrease the number of the elements.

In order to achieve this object, an instrument panel structure according to the present invention, which is provided in front of a front seat in a car, comprises: a steering support beam extended inside said panel structure in parallel therewith and supported by both side walls structure of said car; a panel for covering the steering support beam; a knee guard disposed between the steering support beam and the instrument panel; and an air-conditioning duct fixed to the instrument panel above the knee guard for forming a duct space with the instrument panel so as to strengthen said structure and to improve a safety level without increasing elements.

According to the present invention, a duct for an air-conditioner and a knee guard can support the passenger's legs during an accident, thereby preventing the "submarine" phenomenon and improving passenger's safety. Additionally, the duct reinforces the instrument panel, thereby reducing the need for other reinforcing elements in the instrument panel. This serves to reduce the number of elements and provide a space for arranging other elements.

Preferably, the duct has a cross section of L shape and both ends of the L shaped duct are fixed to the instrument panel. This configuration is much effective.

The duct may have a center connecting portion on a side of the driver's seat and a side connecting portion on an opposite side of the driver's seat. In this case, the center connecting portion is preferably connected with a center duct outlet ("grille center ventilation") and the side connecting portion is preferably connected with a side duct outlet ("grille side ventilation").

In addition, the duct is preferably provided with a rib or plural ribs extending downwardly from the bottom thereof. The rib increases the strength of the duct.

The rib may extend to the neighborhood of the steering support beam. Preferably the edge of the rib on the side of the steering support beam has a shape complementary to the steering support beam. Such a rib is supported with the steering support beam more reliably when the passenger's knees bump against the instrument panel and the duct.

BRIEF DESCRIPTION OF THE DRAWINGS

FIG. 1 is a perspective view of a first embodiment of an instrument panel structure according to the present invention;

FIG. 2 is a sectional view along line II—II of FIG. 1;

FIG. 3 is an exploded perspective view of the structure shown in FIG. 1;

DESCRIPTION OF THE PREFERRED EMBODIMENTS

Figure 4:
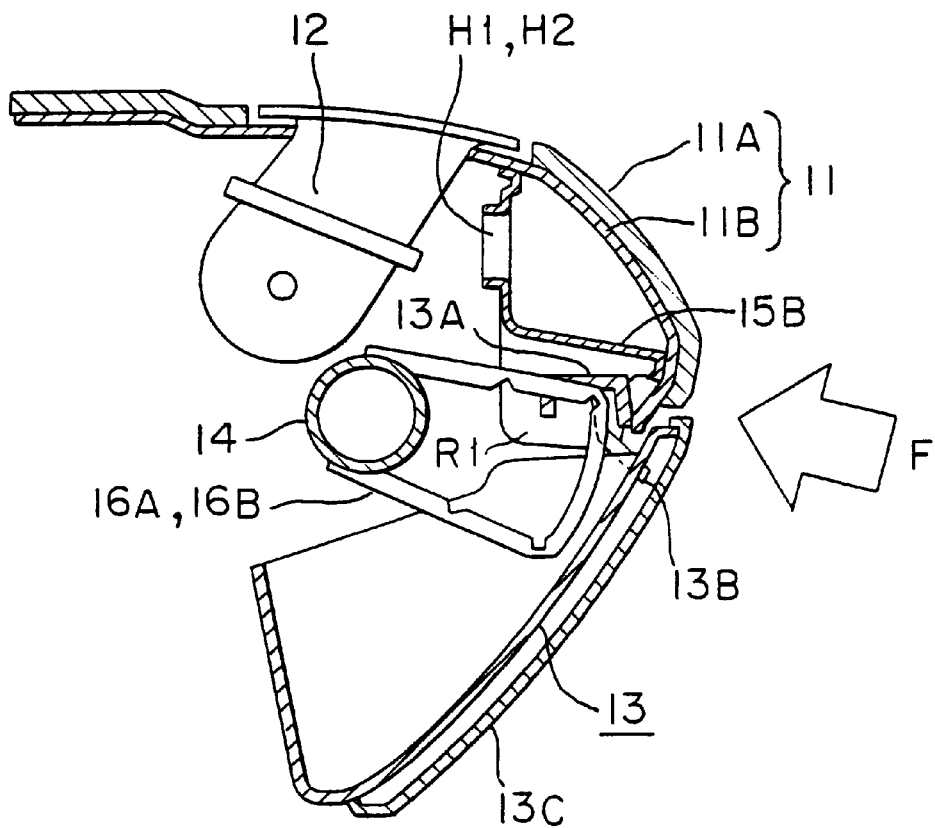
FIG. 4 is a fragmental sectional view of a second embodiment of the instrument panel structure.

Embodiments of the invention will now be described in more detail with reference to drawings.

FIG. 1 is a perspective view of a first embodiment of the instrument panel structure according to the present invention. FIG. 2 is a sectional view along line II—II of FIG. 1. FIG. 3 is an exploded perspective view of FIG. 1. The like references identify identical elements in FIGS. 1 to 3.

As shown in FIG. 1, an air bag 12 for a front passenger is mounted in the upper portion of the instrument panel 11. A glove box 13 is arranged in the lower portion of the instrument panel 11.

As shown in FIG. 2, the instrument panel 11 comprises an instrument panel core 11B and an instrument panel cover 11A covering the outside surface of the instrument panel core 11B.

The glove box 13 is arranged in the instrument panel 11. As shown in FIG. 2 and FIG. 3, the glove box 13 is kept closed by a locking mechanism which engages with a striker 13B mounted at a bracket 13A. The bracket 13A including the striker 13B, is mounted on the inside of the instrument panel 11.

A lid 13C covers the front surface of the glove box 13 i.e. the surface facing the front passenger seat.

A steering support beam 14 and an air-conditioning duct 15 are arranged within the instrument panel 11. The steering support beam 14 is laterally laid across the front of the driver's seat and the front passenger seat. Both ends of the steering support beam 14 are connected to the front pillars (not shown) respectively to support the steering system on the side of the driver's seat.

Knee guards 16A and 16B are mounted on the steering support beam 14 on the front passenger seat side at positions to face the lid 13C of the glove box 13. Each knee guard 16A, 16B is substantially a U-shaped element. Both ends of each knee guard 16A, 16B are connected to the steering support beam 14 respectively.

Figure 8:
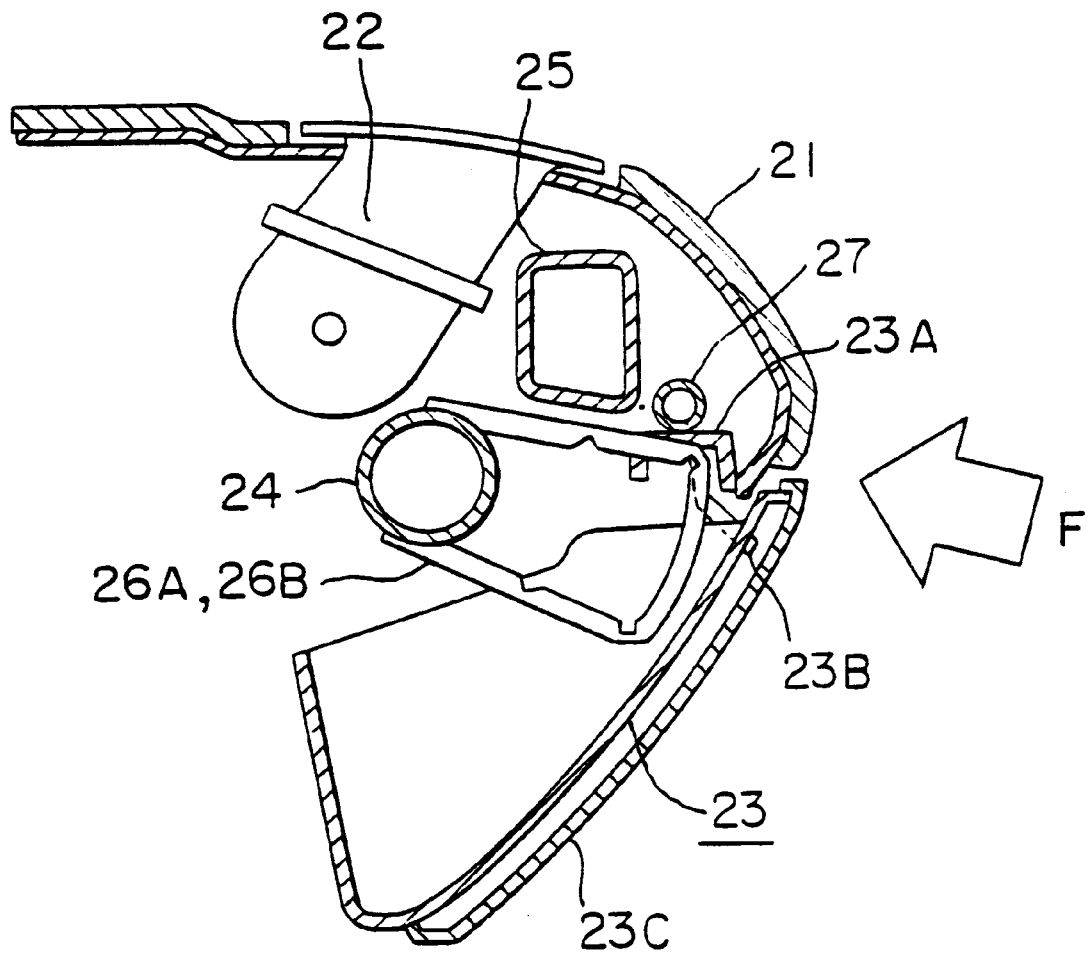
FIG. 8 is a sectional view of a conventional instrument panel structure.
Figure 9:
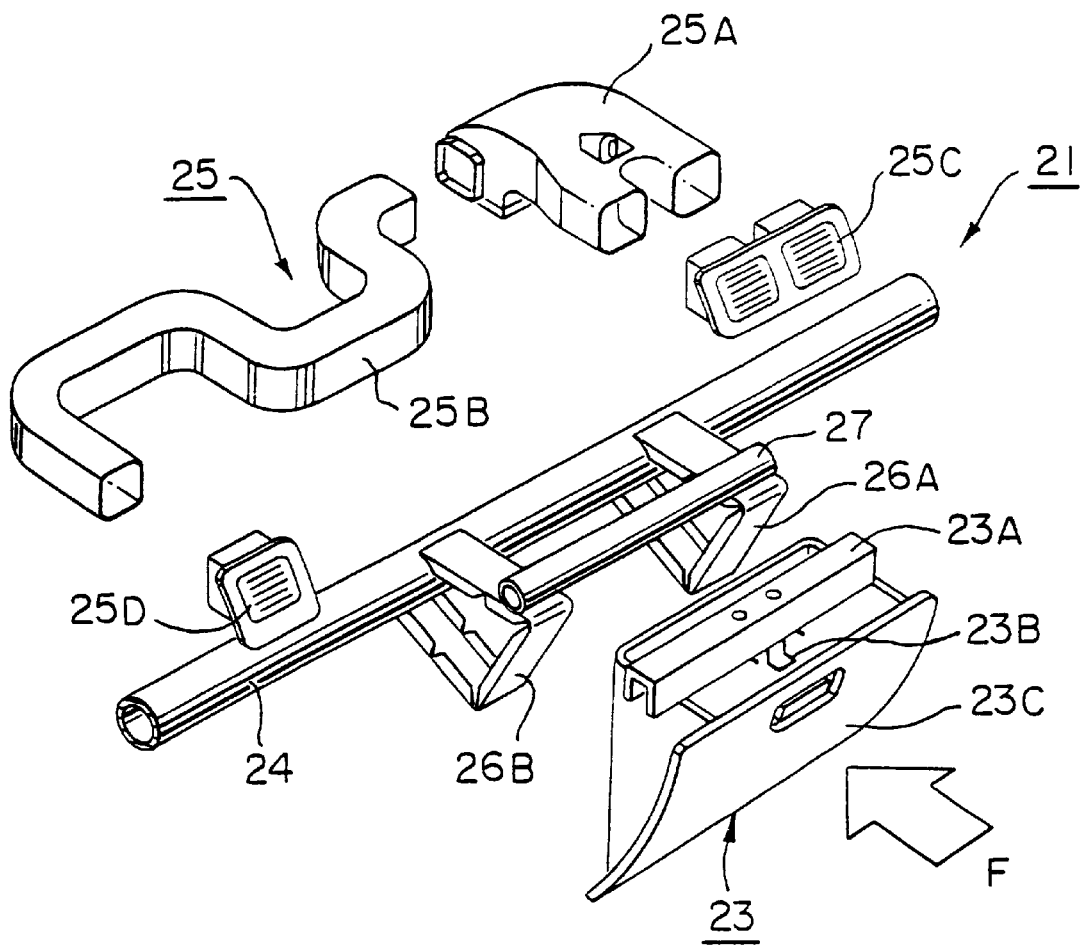
FIG. 9 is an exploded perspective view of the conventional instrument panel structure.

This instrument panel structure comprises no knee guard bar 27 between the knee guards 16A and 16B, which is found in the conventional structure as shown in FIGS. 8 and 9.

The knee guards 16A and 16B face the inside left and right edges of the lid 13C of the glove box 13 respectively. When an unexpected collision occurs, the knee guards 16A and 16B crumple to absorb the energy of the inertia F of his or her legs in the front passenger seat and receive his or her knees and the lid 13C together with the steering support beam 14.

This prevents the glove box 13 and the front passenger from being pushed under the instrument panel 11, thereby preventing a "submarine" phenomenon.

The air-conditioning duct 15 is communicated with any type of air conditioners (not shown) to ventilate the outside air, inside circulated air, cooled air, heated air or the like into the interior of the car. The air-conditioning duct 15 comprises a center duct ("duct center ventilation") 15A arranged in the central portion, and a connecting duct 15C, a reinforcing duct 15B, and a connecting duct 15D arranged in turn on the passenger seat side.

The reinforcing duct 15B of the air-conditioning duct 15 serves as a ventilating passage for ventilating an air-conditioned air into a side duct outlet "grille side ventilation" 15F. Additionally, the reinforcing duct 15B reinforces the mechanical strength between the air bag 12 and the glove box 13 (i.e. around the glove box 13) of the instrument panel 11 against the inertial force F of the legs of the passenger during an unexpected collision.

The reinforcing duct 15B has substantially an L-shaped cross section. The reinforcing duct 15B is attached directly to the instrument panel core 11B, which forms the inside wall of the instrument panel 11, at a position above the pair of knee guards 16A and 16B in the vertical direction and overlapping with the knee guards 16A and 16B in the lateral direction. The reinforcing duct 15B thereby forms a closed space (duct space) with the instrument panel core 11B along the lateral direction and improves the rigidity of the instrument panel 11. The closed space serves as a ventilation passageway for ventilating the conditioned air.

The reinforcing duct 15B has a center connecting portion H1 near the edge thereof on the side of the driver's seat. The center connecting portion H1 is connected with the center duct ("duct center ventilation") 15A and the central duct outlet ("grille center ventillation") 15E via the connecting duct 15C. The reinforcing duct 15B has also a side connecting portion H2 near the edge thereof on the side of the front passenger's seat (on the opposite side of the driver's seat). The side connecting portion H2 is connected with the side duct ("grille side ventilation") 15F via the connecting duct 15D.

Each of the center connecting portion H1 and the side connecting portion H2 is a circular hole in this embodiment, which is communicated with the connecting ducts 15C and 15D respectively.

Under the instrument panel structure described above, the reinforcing duct 15B of the air-conditioning duct 15, which is arranged at the inside of the instrument panel 11, serves as a mechanical reinforcing element against the shock by the passenger during a collision. Therefore, when the knee guards 16A and 16B crumple and abut the reinforcing duct 15B during the collision, the reinforcing duct 15B prevents a further deformation of the knee guards 16A and 16B and raises the effect of the knee guards 16A and 16B. Consequently, the instrument panel structure can prevent the glove box 13 and the front passenger from being pushed under the instrument panel 11.

In addition, the instrument panel 11 is reinforced on the reverse side by the reinforcing duct 15B. This prevents an excessive deformation of the instrument panel 11 during the collision. Thus the instrument panel 11 can receive the chest of the passenger thereby preventing the passenger from hitting his head on the windshield.

The instrument panel structure of the first embodiment can raise the safety level for the passenger against any collision; by preventing the passenger from being pushed under the instrument panel 11 by the knee guards 16A and 16B, the glove box 13, etc., by receiving her or his chest, and by preventing the passenger from hitting his head against the windshield. Furthermore, the reinforcing duct 15B can also reinforce the mechanical strength of the instrument panel 11, thereby reducing the number of elements and providing a space for arranging other elements.

The reinforcing duct 15B may be a simple element which has a L-shaped cross-section, a center connecting portion H1 and a side connecting portion H2. This may make the design simple.

Figure 5:
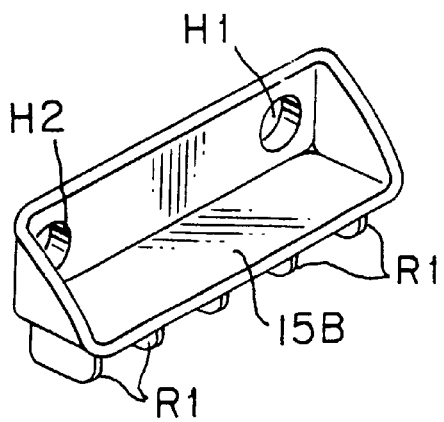
FIG. 5 is a perspective view of an air-conditioning duct of FIG. 4.

A second embodiment of the present invention will now be described. FIG. 4 is a fragmental sectional view of the second embodiment of the instrument panel structure according to the present invention. FIG. 5 is a perspective view of the air-conditioning duct of FIG. 4. The like reference numerals identify identical elements in also FIG. 4 and FIG. 5.

As shown in FIGS. 4 and 5, the reinforcing duct 15B is provided with ribs R1, which may be only one rib R1, extending downwardly from the bottom of reinforcing duct 15B. The ribs R1 prevent the lid 13C of the glove box 13 from being pushed under the instrument panel 11 by the inertial force F of the legs.

The ribs R1 are arranged in parallel on the bottom of the reinforcing duct 15B. The ribs R1 are integral with the reinforcing duct 15B, but could be formed in any other manner.

The instrument panel structure according to the second embodiment can also function similarly to the one according to the first embodiment. Additionally, under the instrument panel structure according to the second embodiment, the ribs R1 can prevent the lid 13C of the glove box 13 from being pushed under the instrument panel 11 by the inertial force F of the legs.

The rigidity of the reinforcing duct 15B is raised since the ribs R1 are integrated with the reinforcing duct 15B in the instrument panel structure. Therefore, the instrument panel structure can further improve the strength against the inertial force F of the legs. Consequently, the instrument panel structure can improve the safety level for the passenger against any collision by preventing the passenger from being pushed under the instrument panel 11.

Figure 6:
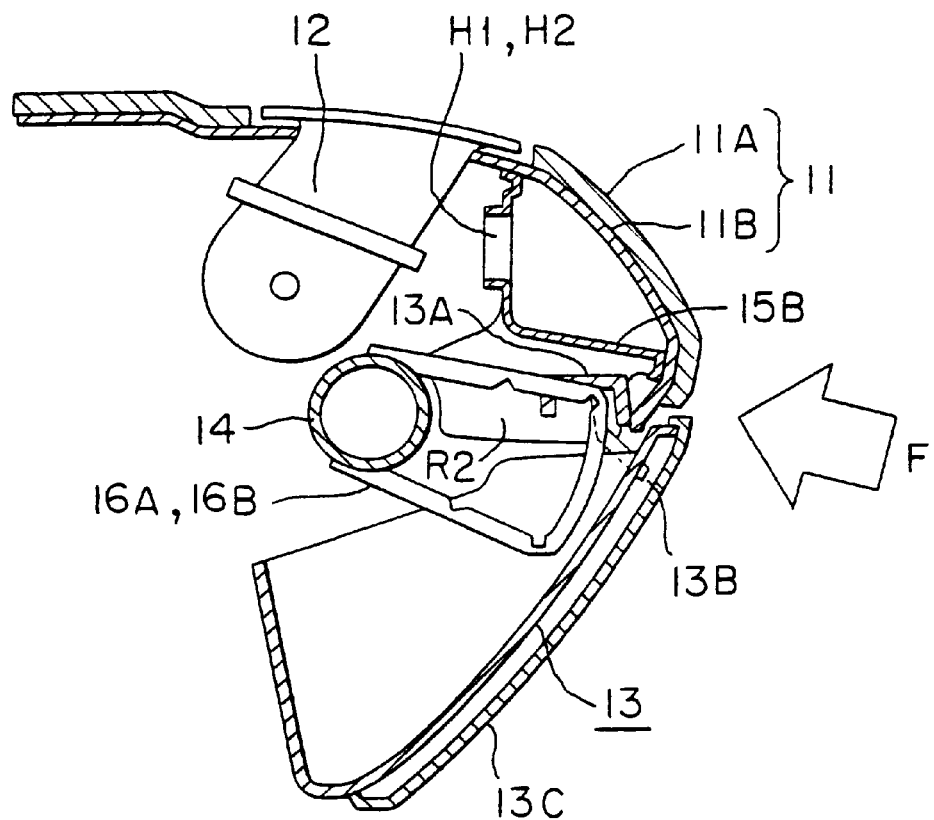
FIG. 6 is a fragmental sectional view of a third embodiment of the instrument panel structure.
Figure 7:
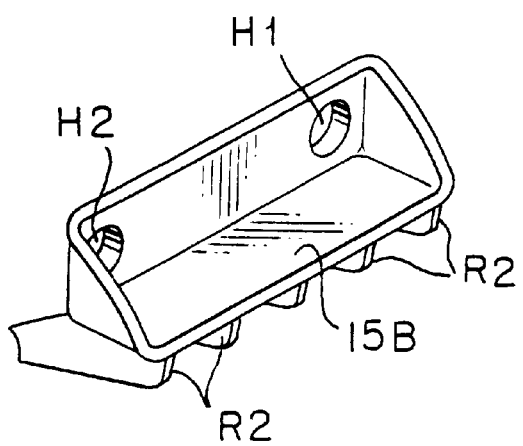
FIG. 7 is a perspective view of an air-conditioning duct of FIG. 6.

A third embodiment of the present invention will now be described. FIG. 6 is a fragmental sectional view of the third embodiment of the instrument panel structure. FIG. 7 is a perspective view of the air-conditioning duct of FIG. 6. The like reference numerals identify identical elements in also FIGS. 6 and 7.

As shown in FIGS. 6 and 7, the reinforcing duct 15B of the air-conditioning duct 15 is provided with ribs R2, which may be only one rib R2, extending downwardly from the bottom of the duct 15B. The ribs R2 prevent the lid 13C of the glove box 13 from being pushed under the instrument panel 11 by the inertial force F of the legs. The ribs R2 also abut to the steering support beam 14 and are supported by the steering support beam 14 when the instrument panel 11 or the lid 13C of the glove box 13 receives the inertial force F of the legs.

The ribs R2 are arranged on the bottom of the reinforcing duct 15B similarly to the ribs R1 in the second embodiment. While, the ribs R2 extend to positions close to the steering support beam 14, the edge of each of the ribs R2 on the side of the steering support beam 14 has a shape complementary to the steering support beam 14.

Under the instrument panel structure according to the third embodiment, the ribs R2 may be supported by the steering support beam 14, thereby further improving the strength of the instrument panel structure against the inertial force F of the legs. Thus, the instrument panel structure prevents the front passenger from being pushed under the instrument panel 11 at any collision. Therefore, the instrument panel structure raises the safety level for the passenger against the collision.

Under each instrument panel structure according to the above embodiments, the reinforcing duct serves also as the mechanical reinforcing element for the inertial force of the passenger's legs at any collision. Therefore, in addition to the knee guards, the reinforcing duct can improve the strength of the instrument panel against the inertial force of the legs around the glove box. Furthermore, the reinforcing duct reinforces the strength of the instrument panel, reducing the need for other reinforcing elements in the instrument panel. This serves to reduce the number of elements, to provide a space for arranging other elements and to raise the safety level without increasing the weight or making the structure complex. This will greatly contribute to the production of the cars.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A structure for an instrument panel for a vehicle, comprising:

a steering support beam extended inside said instrument panel supported by both side walls of said vehicle;

a knee guard mounted on said steering support beam and disposed between said steering support beam and said instrument panel; and a reinforcing duct attached to said instrument panel;

wherein a closed space is defined by said reinforcing duct and said instrument panel above said knee guard in a vertical direction and overlapping with said knee guard in a lateral direction so as to improve the rigidity of said instrument panel.

2. The structure for an instrument panel according to claim 1, wherein:

said reinforcing duct has an L-shaped cross-section.

3. The structure for an instrument panel according to claim 1, wherein:

said reinforcing duct has a center connecting portion on a first side of a seat and a side connecting portion on an opposite side of said seat.

4. A structure for an instrument panel for a vehicle having a glove box arranged in a lower portion of said instrument panel, comprising:

a lid for said glove box for covering a front surface of said glove box;

a steering support beam extended inside said instrument panel in a lateral direction of said vehicle;

a knee guard mounted on said steering support beam facing said lid and between said steering support beam and said instrument panel; and a reinforcing duct attached to an inside wall of said instrument panel above said knee guard in a vertical direction and overlapping in a lateral direction with said knee guard;

wherein a closed space is defined by said reinforcing duct and said inside wall for strengthening said instrument panel and for serving as an air conditioning duct.

5. A structure for an instrument panel for a vehicle having an air conditioner and a center duct outlet and a side duct outlet for ventilating air-conditioned air into said vehicle, the structure comprising:

a steering support beam extended inside said instrument panel supported by both side walls of said vehicle;

a knee guard disposed between said steering support beam and said instrument panel; and a reinforcing duct fixed to the instrument panel above the knee guard for forming a closed space with said instrument panel so as to strengthen said instrument panel, wherein said reinforcing duct is provided with a rib extending downwardly from a bottom thereof and wherein said closed space serves as a ventilation passageway for ventilating conditioned air.

6. The structure for an instrument panel according to claim 5, wherein:

said rib extends to a position close to the steering support beam.

7. The structure for an instrument panel according to claim 6, wherein:

said rib has an edge on a side of said steering support beam, said edge having a shape complementary to said steering support beam.

8. The structure for an instrument panel according to claim 5, wherein:

said reinforcing duct is integral with the rib.

9. The structure for an instrument panel according to claim 6, wherein:

said reinforcing duct is integral with the rib.

10. The structure for an instrument panel according to claim 7, wherein:

said reinforcing duct is integral with the rib.

11. A structure for an instrument panel for a vehicle having an air conditioner and a center duct outlet and a side duct outlet for ventilating air-conditioned air into said vehicle, the structure comprising:

a steering support beam extended inside said instrument panel supported by both side walls of said vehicle;

a knee guard disposed between said steering support beam and said instrument panel;

a reinforcing duct fixed to the instrument panel above the knee guard for forming a closed space with said instrument panel so as to strengthen said instrument panel;

a center connecting portion provided in said reinforcing duct to connect with said center duct outlet; and a side connecting portion provided in said reinforcing duct to connect with said side duct outlet.

* * * * *